United States Patent
Spierling et al.

(10) Patent No.: US 12,003,132 B2
(45) Date of Patent: Jun. 4, 2024

(54) HYBRID ELECTRIC SECONDARY POWER AND BATTERY CHARGING ARCHITECTURE AND CONTROL SYSTEM

(71) Applicant: Hamilton Sundstrand Corporation, Charlotte, NC (US)

(72) Inventors: Todd A. Spierling, Rockford, IL (US); Robert A. Bayles, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/746,570

(22) Filed: May 17, 2022

(65) Prior Publication Data
US 2023/0378796 A1    Nov. 23, 2023

(51) Int. Cl.
*H02J 7/00* (2006.01)
*B60L 53/20* (2019.01)
(Continued)

(52) U.S. Cl.
CPC ........ *H02J 7/007182* (2020.01); *B60L 53/20* (2019.02); *B64D 27/24* (2013.01);
(Continued)

(58) Field of Classification Search
CPC .................................................. H02J 7/00714
See application file for complete search history.

(56) References Cited

U.S. PATENT DOCUMENTS

| | | | |
|---|---|---|---|
| 5,861,730 A | * | 1/1999 | Lee ...................... H02J 7/00711 320/132 |
| 8,128,019 B2 | | 3/2012 | Annati et al. |

(Continued)

FOREIGN PATENT DOCUMENTS

| | | |
|---|---|---|
| CA | 3131251 A1 | 9/2020 |
| EP | 1414101 B1 | 5/2008 |

(Continued)

OTHER PUBLICATIONS

Donateo et al., "Fuel economy of hybrid electric flight" Applied energy 206 (Nov. 2017) pp. 723-738.

(Continued)

*Primary Examiner* — Daniel Kessie
(74) *Attorney, Agent, or Firm* — CANTOR COLBURN LLP (57) ABSTRACT

An aircraft hybrid electrical system includes an electric power generating system in signal communication with a thermal combustion engine, a secondary power system in signal communication with the electric power generating system, and a battery in signal communication with the electric power generating system and the secondary power system. The aircraft hybrid electrical system further comprises a system controller in signal communication with the electric power generating system, secondary power system, and the battery. The system controller is configured to monitor a charge capacity of the battery and selectively operate in a current charge mode and a voltage charge mode to charge the battery. The system controller invokes the current charge mode in response to detecting the charge capacity falls below a charge capacity threshold, and invokes the voltage charge mode in response to detecting the charge capacity reaches a target value.

19 Claims, 6 Drawing Sheets

(51) Int. Cl.
   *B64D 27/24* (2006.01)
   *H02J 7/02* (2016.01)
   *B64D 27/02* (2006.01)

(52) U.S. Cl.
   CPC .............. *H02J 7/0048* (2020.01); *H02J 7/02* (2013.01); *B60L 2210/30* (2013.01); *B64D 27/026* (2024.01); *H02J 2207/20* (2020.01)

(56) References Cited

U.S. PATENT DOCUMENTS

| | | | |
|---|---|---|---|
| 9,586,690 | B2 | 3/2017 | Rajashekara et al. |
| 11,233,470 | B2 | 1/2022 | Latulipe et al. |
| 11,316,356 | B2* | 4/2022 | Kondo ................. G01R 31/367 |
| 11,708,171 | B2 | 7/2023 | Inaoka et al. |
| 2014/0184165 | A1* | 7/2014 | Takahashi ............. H01M 10/48 |
| | | | 429/90 |
| 2015/0151844 | A1 | 6/2015 | Anton et al. |
| 2019/0181786 | A1* | 6/2019 | Singh ..................... B64D 41/00 |
| 2020/0062413 | A1* | 2/2020 | Feddersen ............. B64D 31/00 |
| 2021/0039801 | A1 | 2/2021 | Spierling et al. |
| 2021/0143657 | A1 | 5/2021 | Zagrodnik |
| 2021/0323425 | A1 | 10/2021 | Minshull et al. |
| 2021/0339877 | A1 | 11/2021 | Salanne et al. |
| 2021/0347491 | A1 | 11/2021 | Delbosc et al. |

FOREIGN PATENT DOCUMENTS

| | | |
|---|---|---|
| WO | 2020174165 A1 | 9/2020 |
| WO | 2021039475 A1 | 3/2021 |

OTHER PUBLICATIONS

Search Report issued in European Patent Application No. 23173127.4; Application Filing Date May 12, 2023; Date of Mailing Oct. 20, 2023 (11 pages).

* cited by examiner

HYBRID ELECTRIC SECONDARY POWER AND BATTERY CHARGING ARCHITECTURE AND CONTROL SYSTEM

BACKGROUND

Embodiments of the present disclosure relate generally to aircraft electrical systems and, in particular, to hybrid propulsion aircraft electrical architectures that implement a secondary power system and a high-performance battery system.

Traditional aircraft electrical systems operate at a constant regulated voltage typically only control current in the event of a current overload or electrical fault. Recently, aircraft electrical systems are trending toward hybrid propulsion architecture designs (referring to herein simply as hybrid electrical architectures). These hybrid electrical architectures implement both a secondary power system along with a battery power system. The battery power system employs a high-performance battery such as, for example, a lithium ion (Li-ion) battery. Conventional hybrid electrical architectures are designed to include a dedicated battery charging system to provide current and voltage charging profiles tailored to charge the specific high-performance battery utilized in the battery power system. In the past, the high-performance battery was simply used to provide backup power for low-load components but in systems that include a high capacity battery, the added weight, volume, and thermal losses of this battery charging system results in significant vehicle penalties.

BRIEF DESCRIPTION

According to a non-limiting embodiment, an aircraft hybrid electrical system comprises an electric power generating system in signal communication with a thermal combustion engine, a secondary power system in signal communication with the electric power generating system, and a battery in signal communication with the electric power generating system and the secondary power system. The aircraft hybrid electrical system further comprises a system controller in signal communication with the electric power generating system, secondary power system, and the battery. The system controller is configured to monitor a charge capacity of the battery and selectively operate in a current charge mode and a voltage charge mode to charge the battery. The system controller invokes the current charge mode in response to detecting the charge capacity falls below a charge capacity threshold, and invokes the voltage charge mode in response to detecting the charge capacity reaches a target value.

According to one or more non-limiting embodiments, the aircraft hybrid electrical system further includes a feature, wherein the charge capacity ranges from a first charge capacity value indicative of an empty charge capacity of the battery to a second charge capacity indicative of a full charge capacity of the battery. In one or more non-limiting embodiments, and the charge capacity threshold is a threshold value between the first charge capacity value and the second charge capacity value.

According to one or more non-limiting embodiments, the aircraft hybrid electrical system further includes a feature, wherein the system controller operates in the voltage charge mode while the battery charges from the threshold value to the full capacity.

According to one or more non-limiting embodiments, the aircraft hybrid electrical system further comprise a power bus that establishes the signal communication between the power generating system, the secondary power system, and the battery.

According to one or more non-limiting embodiments, the aircraft hybrid electrical system further includes a feature, wherein system controller monitors a bus voltage present on the power bus, and maintains the bus voltage at a targeted bus voltage level to charge the battery according to the current and voltage charge modes while providing power to the secondary power system.

According to one or more non-limiting embodiments, the aircraft hybrid electrical system further includes a feature wherein the system controller controls the electric power generating system to generate the bus voltage based on the operation of the thermal combustion engine, and wherein the power bus delivers the bus voltage to the battery and the secondary power system.

According to one or more non-limiting embodiments, the aircraft hybrid electrical system further includes a feature wherein the secondary power system converts the bus voltage into a secondary voltage, and delivers the secondary voltage to at least one aircraft load.

According to another non-limiting embodiment, an aircraft hybrid electrical system comprises an electric power generating system, a secondary power system, a battery, and a system controller. The electric power generating system is in signal communication with a high spool of a thermal combustion engine and a low spool of the thermal combustion engine. The secondary power system is in signal communication with the electric power generating system. The battery is in signal communication with the electric power generating system and the secondary power system. The system controller is in signal communication with the electric power generating system, the secondary power system, and the battery. The system controller is configured to monitor a charge capacity of the battery and selectively operate in a current charge mode and a voltage charge mode to charge the battery. The system controller invokes the current charge mode in response to detecting the charge capacity falls below a charge capacity threshold, and invokes the voltage charge mode in response to detecting the charge capacity reaches a target value.

According to one or more non-limiting embodiments, the aircraft hybrid electrical system further includes a feature wherein the electric power generating system comprises a first motor generator configured to generate a first alternating current (AC) voltage in response to operating the high spool, a first motor controller configured to rectify the first AC voltage to generate a first direct current (DC) voltage, and a second motor generator configured to generate a second AC voltage in response to operating the high spool, and a first motor controller configured to rectify the second AC voltage to generate a second DC voltage.

According to one or more non-limiting embodiments, the aircraft hybrid electrical system further includes a feature wherein the charge capacity ranges from a first charge capacity value indicative of an empty charge capacity of the battery to a second charge capacity indicative of a full charge capacity of the battery. In one or more non-limiting embodiments, the charge capacity threshold is a threshold value between the first charge capacity value and the second charge capacity value.

According to one or more non-limiting embodiments, the aircraft hybrid electrical system further includes a feature wherein the system controller operates in the voltage charge mode while the battery charges from the threshold value to the full capacity.

According to one or more non-limiting embodiments, the aircraft hybrid electrical system further comprises a power bus that establishes the signal communication between the power generating system, the secondary power system, and the battery.

According to one or more non-limiting embodiments, the aircraft hybrid electrical system further includes a feature wherein system controller monitors a bus voltage present on the power bus, and maintains the bus voltage at a targeted bus voltage level to charge the battery according to the current and voltage charge modes while providing power to the secondary power system.

According to one or more non-limiting embodiments, the aircraft hybrid electrical system further includes a feature wherein one or both of the first DC voltage and the second DC voltage is delivered to the power bus to generate the bus voltage, and wherein the power bus delivers the bus voltage to the battery and the secondary power system.

According to one or more non-limiting embodiments, the aircraft hybrid electrical system further includes a feature wherein the system controller controls one or both of the first motor controller and the second motor controller to adjust the bus voltage delivered to the power bus based on the operation of the thermal combustion engine.

According to one or more non-limiting embodiments, the aircraft hybrid electrical system further includes a feature wherein the secondary power system converts the bus voltage into a secondary voltage, and delivers the secondary voltage to at least one aircraft load.

According to yet another non-limiting embodiment, a method is provided for charging a battery included in an aircraft hybrid electrical system comprising. The method comprises generating, by an electric power generating system, an electric power based on operation of a thermal combustion engine; converting, by a secondary power system, the electric power into a secondary power; delivering the electric power to a battery; monitoring, by a system controller, a charge capacity of the battery; invoking a current charge mode of the system controller in response to detecting the charge capacity falling below a charge capacity threshold to increase the charge capacity of the battery; and switching the system controller from the current charge mode to a voltage charge mode of the system controller in response to detecting the charge capacity reaches a target value to continue charging the battery so that the charge capacity reaches a full capacity.

According to one or more non-limiting embodiments, the aircraft hybrid electrical system includes a feature, wherein the charge capacity ranges from a first charge capacity value indicative of an empty charge capacity of the battery to a second charge capacity indicative of the full charge capacity. According to one or more non-limiting embodiments, the charge capacity threshold is a threshold value between the first charge capacity value and the second charge capacity value.

According to one or more non-limiting embodiments, the method further comprises operating the system controller in the voltage charge mode while the battery charges from the threshold value to the full capacity.

According to one or more non-limiting embodiments, the method further comprises outputting the electric power from the electric power generating system to a power bus connected to the secondary power system and the battery; monitoring, using the system controller, a bus voltage present on the power bus; and maintaining the bus voltage at a targeted bus voltage level to charge the battery according to the current and voltage charge modes while providing the electric power to the secondary power system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Current trends in aircraft hybrid electrical architectures is to employ a high-performance battery to power additional loads, which require a larger dedicated battery charging unit (referred to simply as a battery charger) than used in previously designed hybrid electrical systems. As a result, the battery chargers necessary for charging the larger-sized batteries have themselves become larger and require additional components. The increased weight and complexity of the battery charger, however, increases the overall weight of the aircraft and therefore contributes to reduced fuel efficiency of the aircraft.

Embodiments of the present disclosure provide an aircraft hybrid electrical system that includes a secondary power system and a high-performance battery. Unlike conventional systems, non-limiting embodiments of the aircraft hybrid electrical system described herein employ a power control system capable of charging the high-performance battery without implementing a dedicated battery charger. In this manner, a charging profile tailored to the high-performance battery is still provided while also reducing the overall weight of the aircraft.

Figure 1:
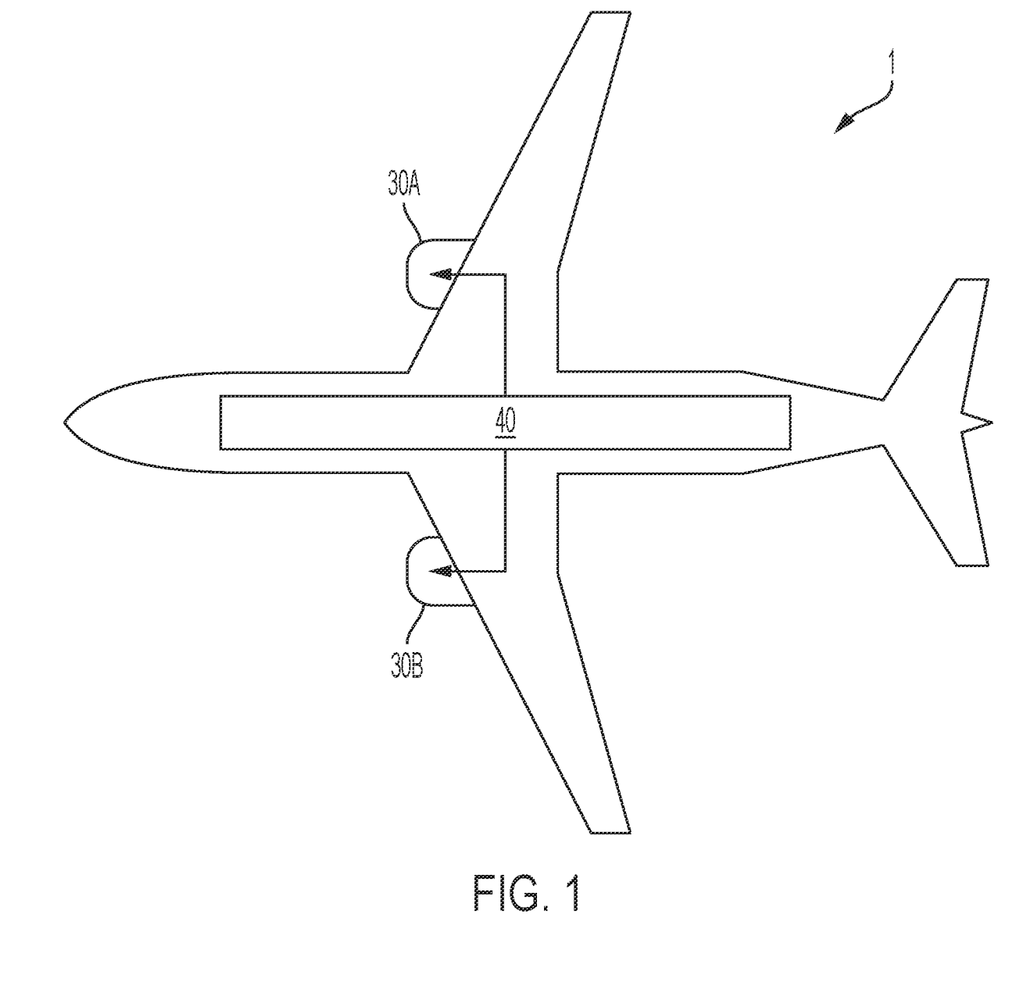
FIG. 1 depicts an aircraft comprising a propulsion system including one or more engine systems according to a non-limiting embodiment of the present disclosure.

With reference now to FIG. 1, an aircraft 1 is illustrated according to a non-limiting embodiment. The aircraft 1 includes a propulsion system including one or more engine systems 30 and a hybrid electrical system 40.

Figure 2:
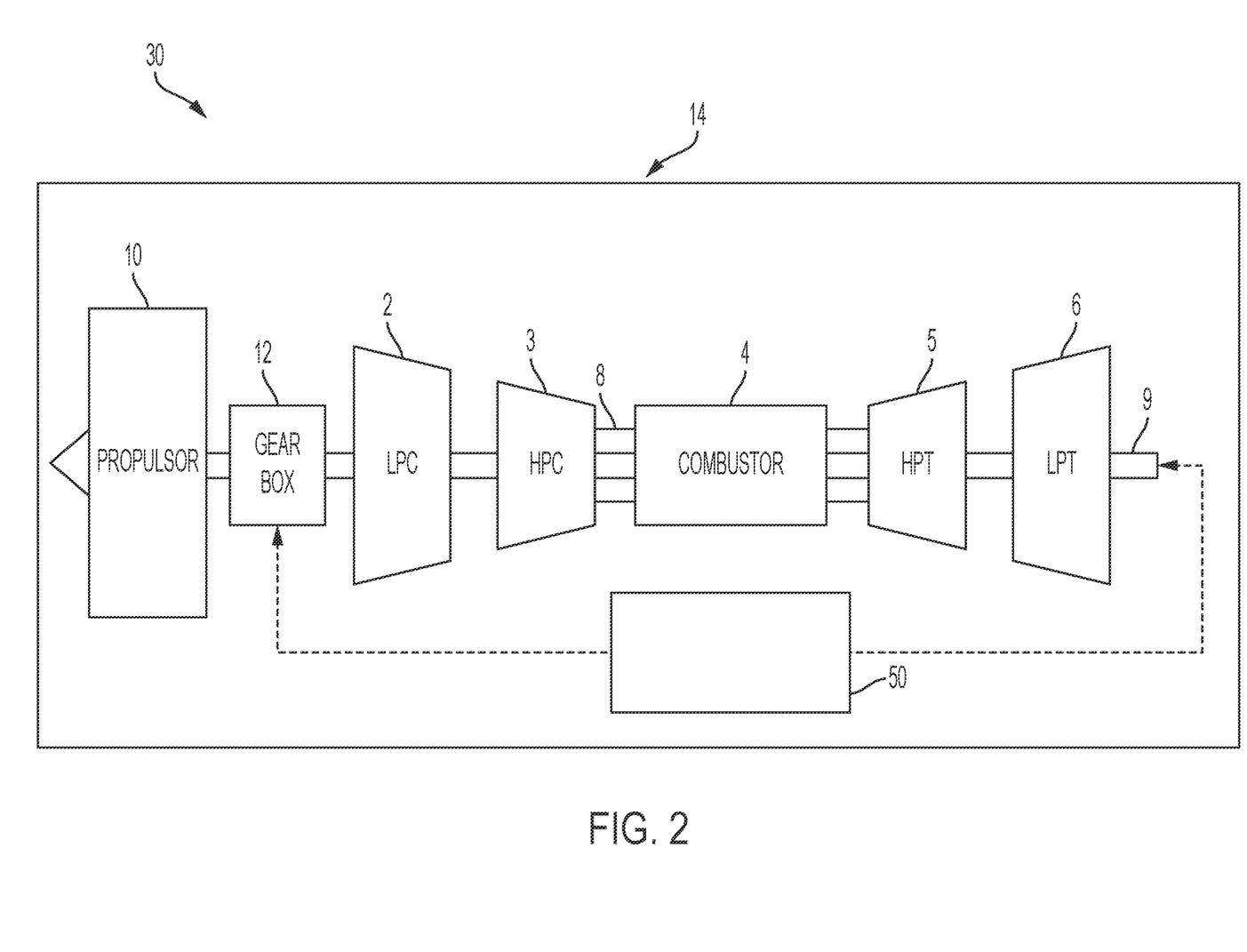
FIG. 2 is a block diagram illustrating an engine system according to a non-limiting embodiment of the present disclosure.

FIG. 2 depicts an engine system 30 according to a non-limiting embodiment. The engine system 30 includes a thermal combustion engine 14 including a combustor chamber 4 and may include one or more compressor sections (e.g., a low pressure compressor section 2, a high pressure compressor section 3), and one or more turbine sections (e.g., a high pressure turbine section 5 and a low pressure turbine section 6). The thermal combustion engine 14 may comprise a rotating shaft or a first shaft 9 (e.g., a low pressure shaft) which may connect a low pressure compressor section 2 and a low pressure turbine section 6. The thermal combustion engine 14 may comprise a second shaft 8 (e.g. a high pressure shaft) which may connect a high pressure compressor section 3 and a high pressure turbine section 5. A shaft of the engine (e.g., the first shaft 9) may be connected to a propulsor 10 via a connection means 12 (e.g., a gearbox). In one or more embodiments, the thermal combustion engine 14 operates in conjunction with an electric power generating system 50 as described in greater detail below.

Figure 3:
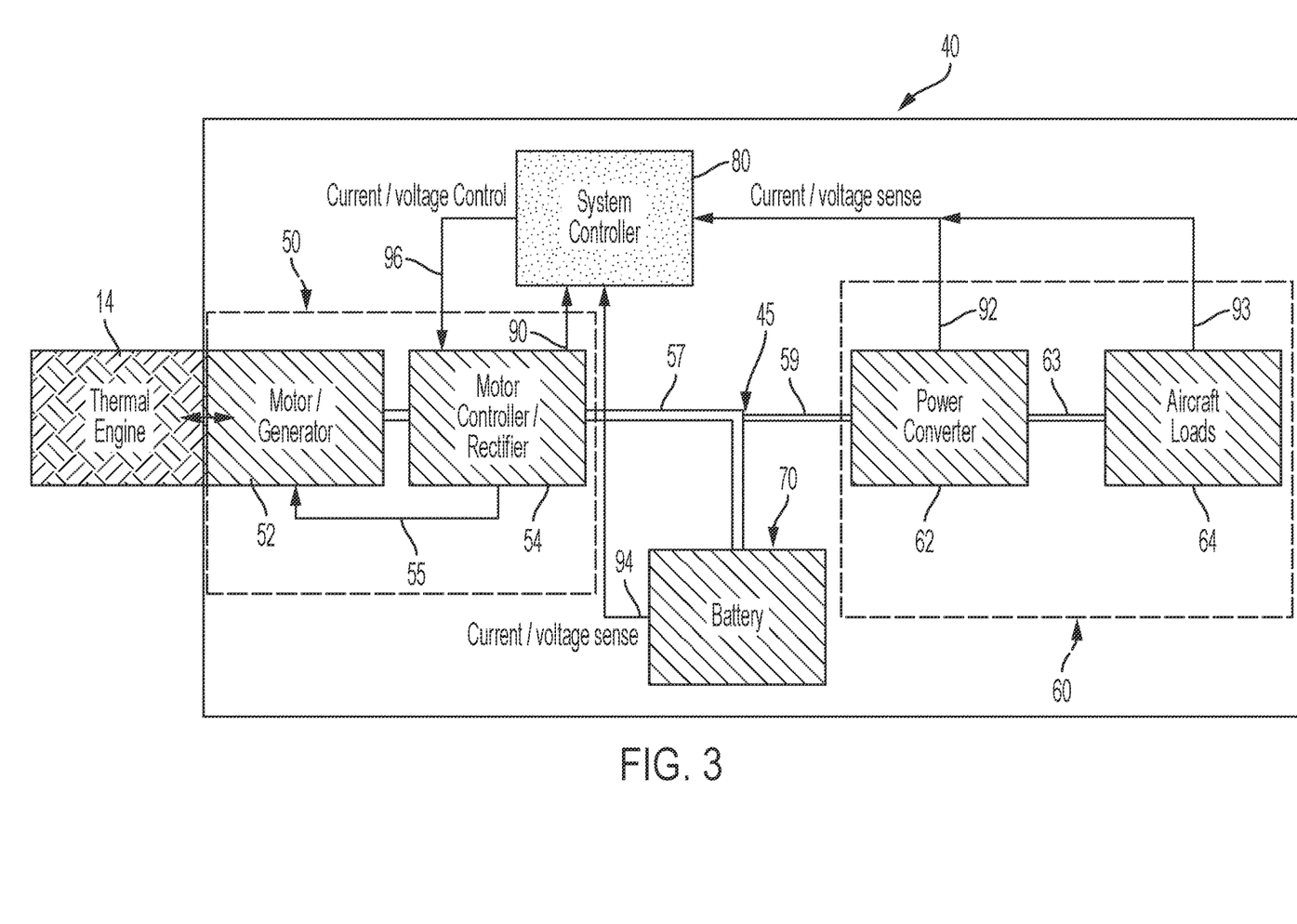
FIG. 3 is a block diagram of an aircraft hybrid electrical system according to a non-limiting embodiment of the present disclosure.

Turning now to FIG. 3, an aircraft hybrid electrical system 40 is illustrated according to a non-limiting embodiment of the present disclosure. The aircraft hybrid electrical system 40 may be referred to as a "parallel hybrid propulsion system," and may correspond to one or both of the engine systems 30A and 30B described above with reference to FIGS. 1 and 2. The aircraft hybrid electrical system 40 includes an electric power generating system 50, a secondary power system 60, a battery 70, and a system controller 80. The electric power generating system 50, the secondary power system 60, and the battery 70 are connected in common with one another via a power bus 45 to facilitate signal communication (e.g., voltage and current) between one another.

The electric power generating system 50 is operable with a thermal combustion engine 14 included in a corresponding engine system 30. The electric power generating system 50 includes a motor generator 52 and a motor controller and rectifier 54. The motor generator 52 can be selectively invoked to operate according to different operating modes. For example, the motor generator 52 can produce torque to drive the thermal engine 14 and provide thrust when operating in a first mode (e.g., a motor mode), but can generate electric power in response to receiving rotational energy from the thermal engine 14 when operating in a second mode (e.g., a generator mode). The motor controller and rectifier 54 can generate a control signal 55 that invokes the different operating modes of the motor generator 52. In addition, the motor controller and rectifier 54 can rectify the alternating current (AC) power generated by the motor generator 52 to generate direct current (DC) power 57 (e.g., the direct current and DC voltage). The DC power 57 is applied to the power bus 45 and defines a bus voltage and bus current, which can be utilized by the secondary power system 60 and/or the battery 70 as described herein.

The secondary power system 60 includes a power converter 62 and one or more aircraft loads 64. The power converter 62 receives an input power 59 from the electric power generating system 50 and/or the battery 70 and converts it into secondary power 63 (e.g., secondary voltage) having different characteristics (e.g., a different type of electrical power or a different voltage level). The power converter 62 can include a DC-to-DC (DC/DC) converter and/or DC-to-AC (DC/AC) converter. The DC/DC or DC/AC converters can be construed in a variety or topologies, and configured to convert a variable voltage into a constant voltage for use in voltage sensitive secondary systems and/or to drive one or more of the aircraft loads 64. In one or more non-limiting embodiments, the DC/DC converter receives an input DC voltage and outputs a lower DC voltage. The DC/AC converter is configured to convert DC power into AC power (e.g., three-phase AC power) for alternating current architectures or architectures that operated at a targeted frequency (e.g., 400 Hz).

The battery 70 is configured as a high-performance battery such as, for example, re-chargeable a lithium ion (Li-ion) battery. The battery 70 is configured to provide stored energy, which can be output and utilized for aircraft propulsion and/or the secondary system 60. In one or more non-limiting embodiments, the battery 70 can be charged using power generated by the motor/generator 52 and output from the electric power generating system 50.

The system controller 80 is in signal communication with the electric power generating system 50, the secondary power system 60, and the battery 70. The system controller 80 is configured to monitor sensed current and/or voltage data corresponding to the electric power generating system 50, the secondary power system 60, and/or the battery 70, and control the electric power generating system 50, based on the sensed currents and/or voltages. The sensed current and/or voltage data includes generator sensed current/voltages 90 (e.g., output from one or more generator sensors), power converter sensed current/voltages 92 (e.g., output from one or more power converter sensors), sensed aircraft load current/voltages 93 (e.g., output from one or more load sensors), and battery sensed current/voltages 94 (e.g., output from one or more battery sensors). Based on the sensed current and/or voltage data 90, 92, 93, and/or 94, (and in some embodiments additional inputs from ancillary engine and/or airframe controllers) the system controller 80 is configured to output one or more control signals 96 that controls the operation of the electric power generating system 50 (e.g., the motor/generator 52 and/or the motor controller/rectifier 54). In one or more non-limiting embodiments, the system controller 80 can also monitor the sensed current and/or voltage data 90, 92, 93, and/or 94 and output control signals 96 that provide overload and fault protection.

The control signals 96 generated by the system controller 80 are used to maintain the voltage (e.g., the bus voltage) on the power bus 45 at a targeted bus voltage level to properly operate the battery 70 while also providing power to the power converter 62. In one or more non-limiting embodiments, the system controller 80 is configured to first prioritize battery current and voltage to properly charge the battery 70. Accordingly, the system controller 80 can monitor the battery sensed current/voltages 94 and generate control signals 96 to actively control the electric power generating system 50 to output DC power 57 that ensures the battery 70 is properly charged and the power converter 62 consumes the necessary power for driving the aircraft loads 64.

Figure 4:
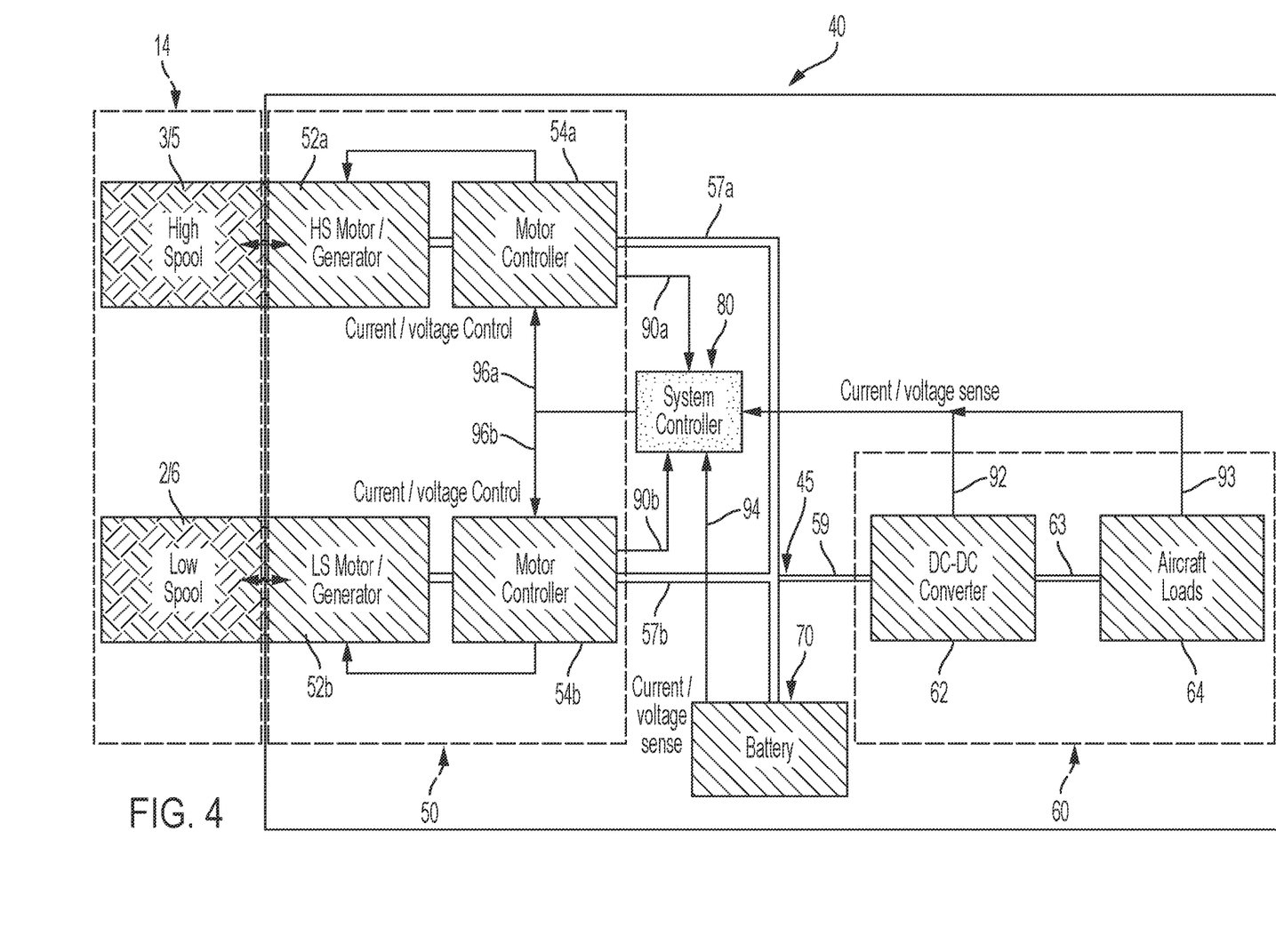
FIG. 4 is a block diagram of an aircraft hybrid electrical system according to a non-limiting embodiment of the present disclosure.

Referring to FIG. 4, an aircraft hybrid electrical system 40 is illustrated according to another non-limiting embodiment of the present disclosure. The architecture of the aircraft hybrid electrical system 40 shown in FIG. 4 is similar to the architecture of the aircraft hybrid electrical system 40 shown in FIG. 3, but includes a high-spool motor generator 52a and a low-spool motor generator 52b. The high-spool motor/generator 52a corresponds to the high spool 3 and 5 of the engine 14 and can be controlled by a first motor controller 54a. The low-spool motor/generator 52b corresponds to the low spool 2 and 6 of the engine 14 and can be controlled by a second motor controller 54b. Although two separate and individual motor controllers 54a and 54b are illustrated, it should be appreciated that a single motor controller 54 can be implemented to independently control both the high-spool motor/generator 52a and the low-spool motor/generator 52b without departing from the scope of the invention. Accordingly, the remaining components and systems (e.g., the electric power generating system 50, the secondary power system 60, the battery 70 and the system controller 80) of the aircraft hybrid electrical system 40 illustrated in FIG. 4 operate similar to those included in the aircraft hybrid electrical system 40 shown in FIG. 3. Therefore, descriptions of the remaining components and systems will not be repeated for the sake of brevity.

In one or more non-limiting embodiments, the system controller 80 included in either embodiment illustrated in FIG. 3 or 4 stores a charging profile that is designed specifically for the battery 70. Accordingly, the system controller 80 can selectively invoke different charging modes to control the electric power generating system 50 to charge the battery 70 according to the charging profile. In one or more non-limiting embodiments, the system 40 is configured to use inter-changeable batteries 70. For example, the battery 70 can be swapped out and changed with a different battery as battery technologies change over time or as the battery 70 ages over time. Accordingly, the charging profile stored in the system controller 80 can be changed or updated as the battery 70 used in the system 40 is inter-changed or swapped out.

Figure 5:
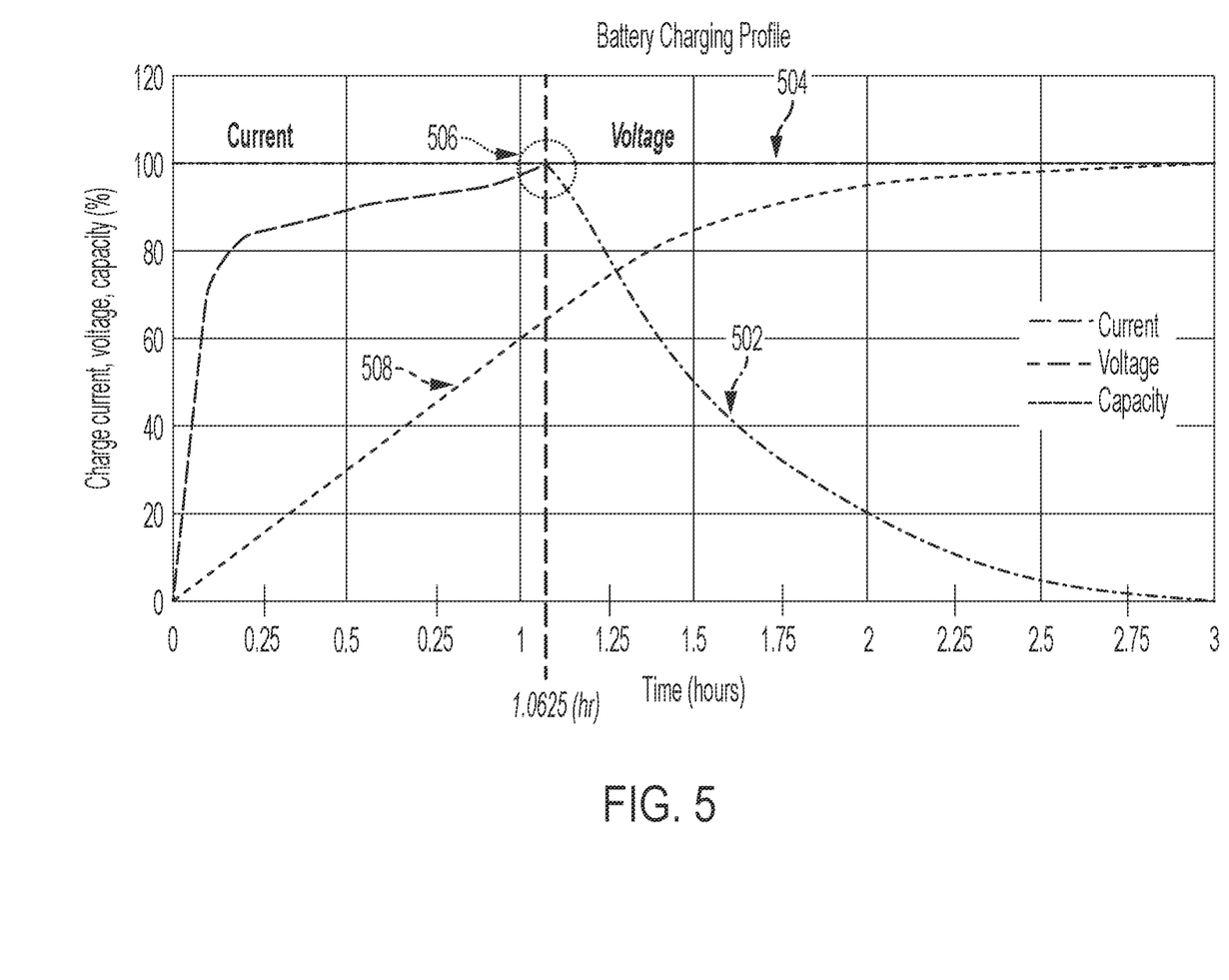
FIG. 5 is a diagram illustrating a target charging current profile and cell voltage profile for charging a high-performance battery over time a non-limiting embodiment of the present disclosure.

FIG. 5 illustrates a charging profile 500 for charging a high-performance battery 70 according to a non-limiting embodiment. The charging profile 500 defines a target current profile 502 and target voltage profile 504. As described herein, the charging profile 500 is stored in the system controller 80. Accordingly, the system controller 80 can selectively operate in a target current mode and a target voltage mode to ensure the battery 70 is charged according to the charging profile 500.

When there is a need to charge the battery 70, the system controller can initially invoke the target current mode. In response to invoking the target current mode, the system controller 80 generates control signals 96 that control the electric power generating system 50 to output current that is delivered to the battery 70. The system controller 80 monitors the sensed battery current and voltages 94 and actively controls the electric power generating system 50 (using the control signals 96) to achieve the target current profile 502 defined by the charging profile 500.

When the system controller 80 determines that a target voltage level 506 is achieved (e.g., about 4.2 V at about (t)=0.625), the controller 80 invokes the target voltage mode. In one or more non-limiting embodiment, the target voltage level 506 corresponds to the transition point when a particular cell voltage is reached. Once the target voltage level 506 is reached, the target current mode is invoked to hold the battery 70 constant at that cell voltage and to increase the battery capacity 508 the remainder of the way to 100% (e.g., from about 62% to 100%). In response to invoking the target voltage mode, the system controller 80 generates control signals 96 that control the electric power generating system 50 to output current that is delivered to the battery 70, which in turn maintains the battery 70 at the target voltage level 506 (e.g., about 4.2 V). Accordingly, current consumption by the battery 70 begins reducing while the battery 70 is maintained at full (e.g., 100%) cell voltage while the battery 70 is being fully charged to full (e.g., 100%) cell capacity.

Figure 6:
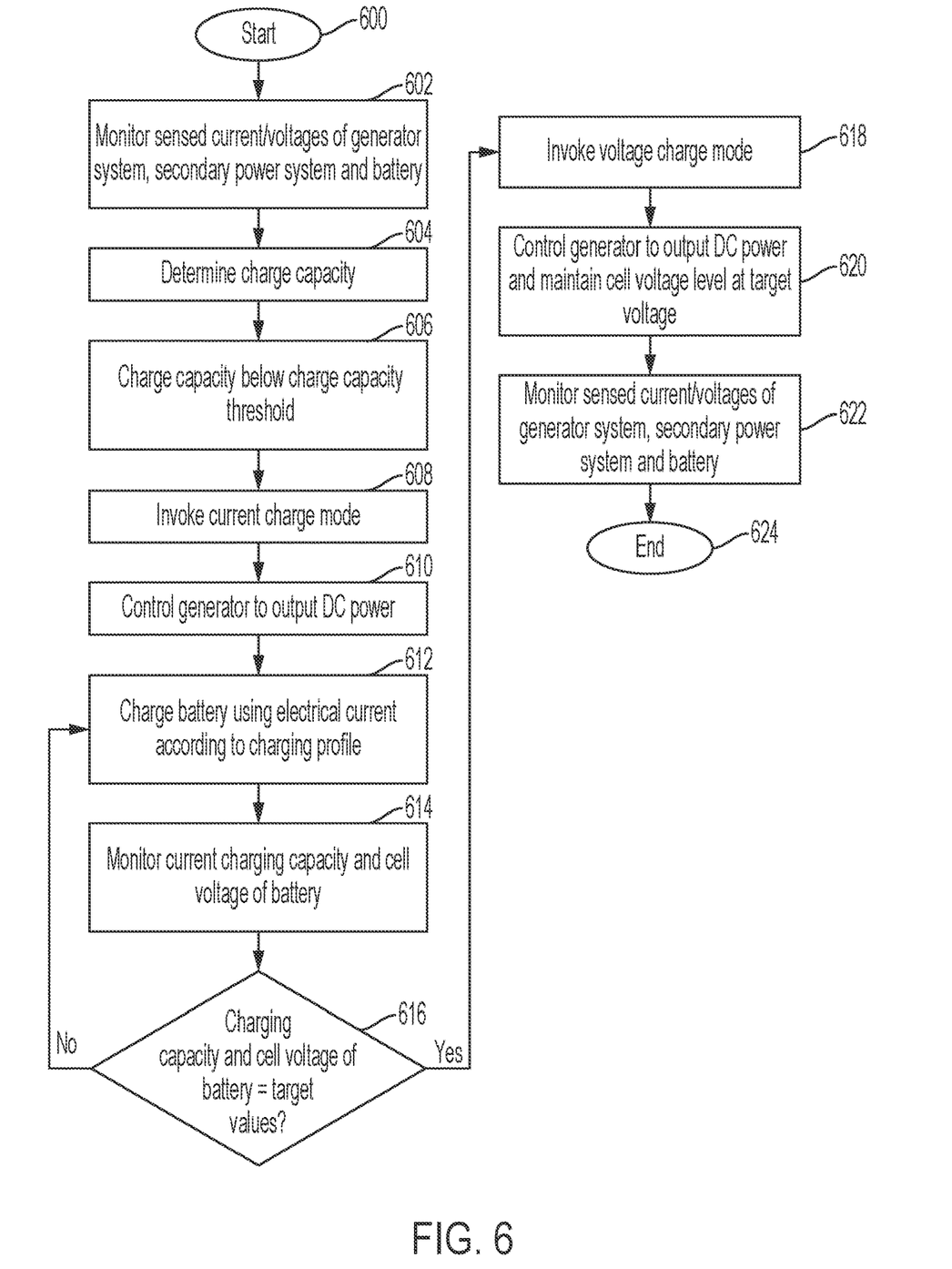
FIG. 6 is a flow diagram illustrating a method of operating a hybrid electric secondary power and battery charging control system according to a non-limiting embodiment of the present disclosure.

Turning now to FIG. 6, a method of operating a hybrid electric secondary power and battery charging control system (also referred to herein as a hybrid electrical system 40) is illustrated according to a non-limiting embodiment of the present disclosure. The method begins at operation 600, and at operation 602 the sensed current/voltages 90, 92, 93, and 94 of the electric power generating system 50, the secondary power system 60, and the battery 70 are monitored. At operation 604, the current charge capacity of a high performance battery 70 included in the hybrid electrical system 40 is determined. At operation 606, a determination is made to charge the battery 70 in response to the battery charge capacity falling below a charge capacity threshold. In one or more non-limiting embodiments, the battery charge capacity ranges from a first charge capacity value indicative of an empty charge capacity of the battery 70 to a second charge capacity indicative of a full charge capacity of the battery, and the charge capacity threshold is set as a threshold value between the first charge capacity value and the second charge capacity value. Accordingly, the system controller 80 can be selectively operated in the in the voltage charge mode and the current charge mode to charge the battery from the threshold value to the full charge capacity of the battery. Turning to operation 608, an electrical current charge mode of the system controller 80 is initiated. At operation 610, the system controller 80 generates control signals 96 to control a electric power generating system 50 and output DC power 57. At operation 612, electrical current corresponding to the DC power 57 is used to charge the battery 70 according to a charging profile. At operation 614, the system controller 80 monitors the current charging capacity and cell voltage 94 of the battery 70. At 616, the system controller 80 determines whether the cell voltage has reached a target voltage. When the cell voltage does not reach the target voltage, the method returns to operation 612 and the electrical current continues to charge the battery 70 according to the charging profile.

When, however, the battery cell voltage reaches the target voltage, the system controller 80 invokes a voltage charging mode at operation 618. At operation 620, the system controller 80 outputs control signals 96 to actively control the electric power generating system 50 and adjust the DC power 57 so that the cell voltage is maintained at the target voltage and the battery 70 is maintained at a target charge capacity. At operation 622, the system controller 80 continues monitoring the sensed battery current/voltage 94, and the method ends at operation 624.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft hybrid electrical system comprising:
an electric power generating system in signal communication with a thermal combustion engine, the electric power generating system comprising:
a motor generator configured to generate an alternating current (AC) voltage;
a motor controller and rectifier configured to rectify the AC voltage to generate a direct current (DC) voltage;
a battery system including a battery in signal communication with the electric power generating system to receive the DC voltage and in signal communication with the secondary power system to deliver a DC battery voltage, the battery system configured to interchange the battery of a first type with a second battery of a second type different from the battery of the first type;
a secondary power system in signal communication with the electric power generating system and the battery system, the secondary power system configured to convert at least one of the DC voltage and the DC battery voltage into a converted DC voltage configured to drive an aircraft load; and
a system controller in signal communication with the electric power generating system, the secondary power system, and the battery, the system controller configured to monitor the DC voltage, the DC battery voltage, and the converted DC voltage, and to control the motor controller and rectifier to adjust a voltage of the DC voltage,
wherein the system controller is configured to store a first charging profile corresponding to the battery of the first type and a second charging profile different corresponding to the second battery of the second type, the system controller configured to monitor a charge capacity of the battery and selectively operate in a current charge mode and a voltage charge mode to charge the battery of the first type according to the first charging profile,
wherein the system controller is configured to invoke the current charge mode in response to detecting the charge capacity falls below a charge capacity threshold and is configured to transition into the voltage charge mode in response to detecting the charge capacity reaches a target value to maintain the battery at a constant target cell voltage,
wherein the controller is configured to detect that the battery of the first type is interchanged with the second battery of the second type, and is configured to selectively operate in a current charge mode and a voltage charge mode to charge the second battery of the second type according to the second charging profile.

2. The aircraft hybrid electrical system of claim 1, wherein the charge capacity ranges from a first charge capacity value indicative of an empty charge capacity of the battery to a second charge capacity indicative of a full charge capacity of the battery, and the charge capacity threshold is a threshold value between the first charge capacity value and the second charge capacity value.

3. The aircraft hybrid electrical system of claim 2, wherein the system controller is configured to operate in the voltage charge mode while the battery charges from the threshold value to the full capacity.

4. The aircraft hybrid electrical system of claim 3, further comprising a power bus configured to establish the signal communication between the power generating system, the secondary power system, and the battery.

5. The aircraft hybrid electrical system of claim 4, wherein system controller configured to monitor a bus voltage present on the power bus, and is configured to maintain the bus voltage at a targeted bus voltage level to charge the battery according to the current and voltage charge modes while providing power to the secondary power system.

6. The aircraft hybrid electrical system of claim 5, wherein the system controller is configured to control the electric power generating system to generate the bus voltage based on the operation of the thermal combustion engine, and wherein the power bus is configured to deliver the bus voltage to the battery and the secondary power system.

7. The aircraft hybrid electrical system of claim 6, wherein the secondary power system is configured to convert the bus voltage into a secondary voltage, and is configured to deliver the secondary voltage to at least one aircraft load.

8. An aircraft hybrid electrical system comprising:
an electric power generating system in signal communication with a high spool of a thermal combustion engine and a low spool of the thermal combustion engine, wherein the electric power generating system comprises:
a first motor generator configured to generate a first alternating current (AC) voltage in response to operating the high spool;
a first motor controller configured to rectify the first AC voltage to generate a first direct current (DC) voltage;
a second motor generator configured to generate a second AC voltage in response to operating the high spool; and
a second motor controller configured to rectify the second AC voltage to generate a second DC voltage;
a battery system including a battery in signal communication with the electric power generating system to receive the DC voltage and in signal communication with the secondary power system to deliver a DC battery voltage, the battery system configured to interchange the battery of a first type with a second battery of a second type different from the battery of the first type;
a secondary power system in signal communication with the electric power generating system; the secondary power system configured to convert at least one of the DC voltage and the DC battery voltage into a converted DC voltage configured to drive an aircraft load; and
a system controller in signal communication with the electric power generating system, the secondary power system, and the battery, the system controller configured to monitor the DC voltage, the DC battery voltage, and the converted DC voltage, and to control the motor controller and rectifier to adjust a voltage of the DC voltage,
wherein the system controller is configured to store a first charging profile corresponding to the battery of the first type and a second charging profile different corresponding to the second battery of the second type, the system controller configured to monitor a charge capacity of the battery and selectively operate in a current charge mode and a voltage charge mode to charge the battery of the first type according to the first charging profile,
wherein the system controller is configured to invoke the current charge mode in response to detecting the charge capacity falls below a charge capacity threshold and is configured to invoke the voltage charge mode in response to detecting the charge capacity reaches a target value,
wherein the controller is configured to detect that the battery of the first type is interchanged with the second battery of the second type, and is configured to selectively operate in a current charge mode and a voltage charge mode to charge the second battery of the second type according to the second charging profile, and
wherein the controller is configured to transition into the voltage charge mode in response to detecting the charge capacity reaches a target value to maintain the battery at a constant target cell voltage.

9. The aircraft hybrid electrical system of claim 8, wherein the charge capacity ranges from a first charge capacity value indicative of an empty charge capacity of the battery to a second charge capacity indicative of a full charge capacity of the battery, and the charge capacity threshold is a threshold value between the first charge capacity value and the second charge capacity value.

10. The aircraft hybrid electrical system of claim 9, wherein the system controller is configured to operate in the voltage charge mode while the battery charges from the threshold value to the full capacity.

11. The aircraft hybrid electrical system of claim 10, further comprising a power bus is configured to establish the signal communication between the power generating system, the secondary power system, and the battery.

12. The aircraft hybrid electrical system of claim 11, wherein system controller is configured to monitor a bus voltage present on the power bus, and is configured to maintain the bus voltage at a targeted bus voltage level to charge the battery according to the current and voltage charge modes while providing power to the secondary power system.

13. The aircraft hybrid electrical system of claim 12, wherein one or both of the first DC voltage and the second DC voltage is configured to be delivered to the power bus to generate the bus voltage, and wherein the power bus is configured to deliver the bus voltage to the battery and the secondary power system.

14. The aircraft hybrid electrical system of claim 13, wherein the system controller is configured to control one or both of the first motor controller and the second motor controller to adjust the bus voltage delivered to the power bus based on the operation of the thermal combustion engine.

15. The aircraft hybrid electrical system of claim 14, wherein the secondary power system is configured to convert the bus voltage into a secondary voltage, and is configured to deliver the secondary voltage to at least one aircraft load.

16. A method of charging a battery included in an aircraft hybrid electrical system comprising, the method comprising:
installing a battery of a first type in a battery system of the aircraft hybrid electrical system;
generating, by an electric power generating system, an electric power based on operation of a thermal combustion engine;
rectifying, by a motor controller and rectifier, the electric power to generate a DC power;
delivering the electric power to the battery of the first type;
outputting DC battery power from the battery of the first type to a secondary power system;
converting, by the secondary power system, the DC battery power into a converted DC power;
monitoring the DC power, the DC battery power, and the converted DC power by a system controller, and controlling the motor controller and rectifier using the system controller to adjust the DC power;
selecting, by the system controller, a first charging profile corresponding to the battery of the first type;
monitoring, by the system controller, a charge capacity of the battery of the first type;
invoking, by the system controller, a current charge mode defined by the first charging profile in response to detecting the charge capacity falling below a charge capacity threshold to increase the charge capacity of the battery;
switching, by the system controller, from the current charge mode to a voltage charge mode defined by the first charging profile in response to detecting the charge capacity reaches a target value to continue charging the battery so that the charge capacity reaches a full capacity;
detecting, by the system controller, that the battery of the first type is interchanged with a second battery of a second type;
invoking, by the system controller, a current charge mode defined by the second charging profile in response to detecting the charge capacity of the second battery is below a charge capacity threshold so as to increase the charge capacity of the second battery;
switching, by the system controller, from the current charge mode to a voltage charge mode defined by the second charging profile in response to detecting the charge capacity of the second battery reaches a target value to continue charging the second battery so that the charge capacity of the second battery reaches a full capacity while maintaining the battery at a constant target cell voltage.

17. The method of claim 16, wherein the charge capacity ranges from a first charge capacity value indicative of an empty charge capacity of the battery to a second charge capacity indicative of the full charge capacity, and wherein the charge capacity threshold is a threshold value between the first charge capacity value and the second charge capacity value.

18. The method of claim 17, further comprising operating the system controller in the voltage charge mode while the battery charges from the threshold value to the full capacity.

19. The method of claim 18, further comprising:
outputting the electric power from the electric power generating system to a power bus connected to the secondary power system and the battery;
monitoring, using the system controller, a bus voltage present on the power bus; and
maintaining the bus voltage at a targeted bus voltage level to charge the battery according to the current and voltage charge modes while providing the electric power to the secondary power system.

* * * * *